Aug. 27, 1957     H. F. JEWETT     2,804,278
AUTOMOBILE CAMERA STANDS
Filed March 29, 1954
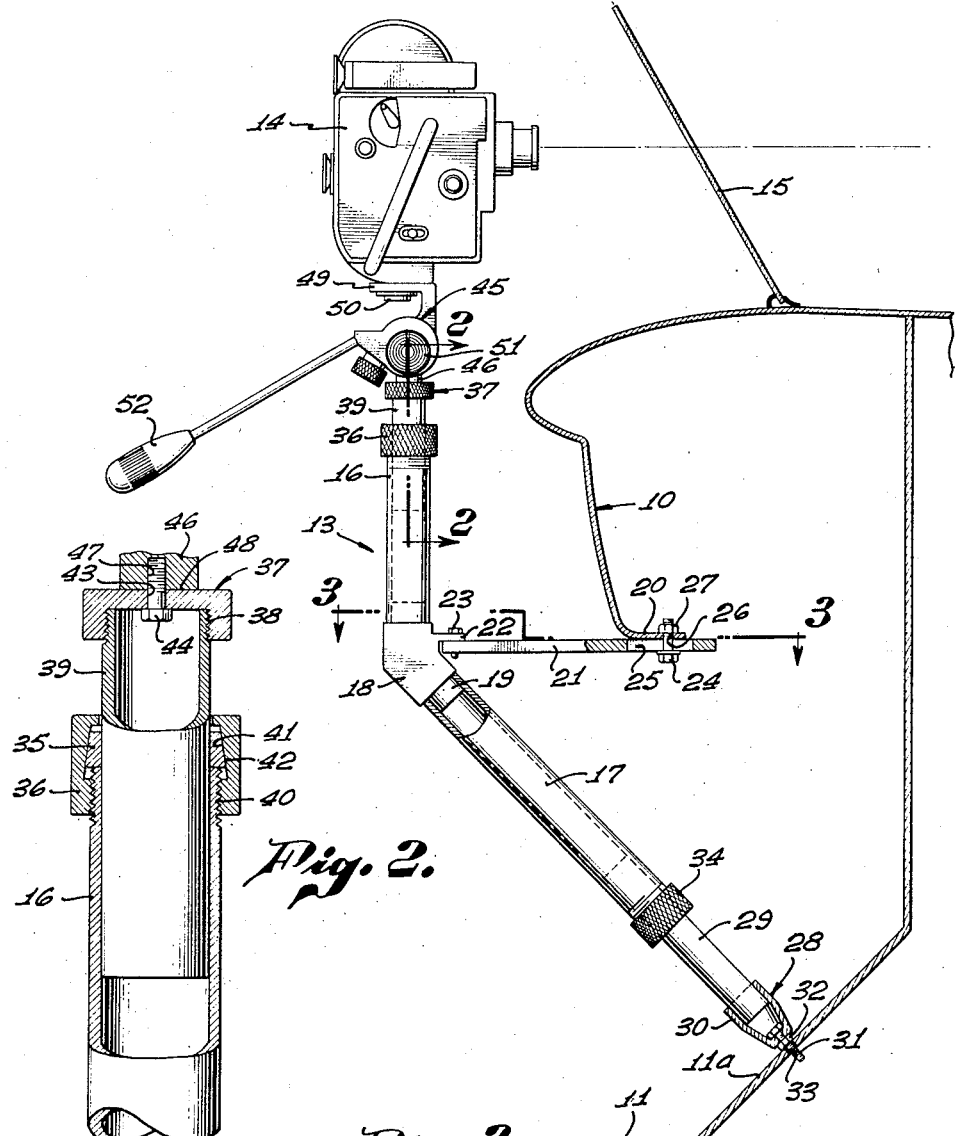
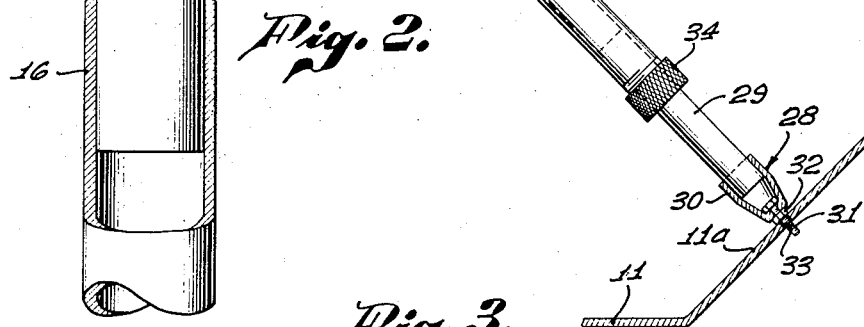
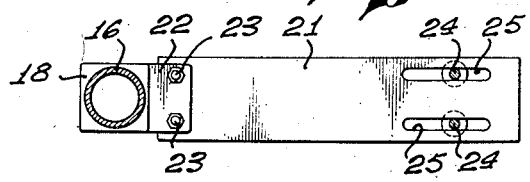
INVENTOR.
HAROLD F. JEWETT,
BY
ATTORNEY

United States Patent Office 2,804,278
Patented Aug. 27, 1957

2,804,278

AUTOMOBILE CAMERA STANDS

Harold F. Jewett, San Gabriel, Calif.

Application March 29, 1954, Serial No. 419,371

11 Claims. (Cl. 248—205)

This invention relates to improved stands for mounting cameras in automobiles.

The general object of the invention is to provide a stand which can effectively mount a camera in an automobile, preferably in the front seat and offset to the right of the driver, and which will support the camera very rigidly and positively, in a manner avoiding vibration or other movement of the camera relative to the vehicle. The device may be so constructed as to permit easy removal of the camera from the car, and desirably also to permit ready removal of the stand itself when not in use. Particularly contemplated is a stand of this type which is easily applied to an automobile, and which is adjustable to fit any of the various different makes of automobiles.

To assure effective support of the stand, I provide the device with two spaced support or mounting elements, which are attached to or engage the automobile at two spaced locations, to positively brace it in the desired position. One of these support elements is preferably connected to the underside of the dashboard of the automobile, while the other support element may bear downwardly against the floorboard. To simplify the connection to the floorboard, the engaging support element may comprise merely a single small dimension pin which is receivable within a small locating opening or recess in the floorboard.

The device is adapted for adjustment to fit different makes of cars by mounting the two support elements to the body of the device for relative adjusting movement. For instance, the lower floor engaging support element may be adjustable generally vertically, to fit various automobiles in which the floorboard to dashboard spacing may vary. The body of the stand may be elongated and extend generally vertically in the automobile, to carry the camera at its upper end. One of the support elements, desirably the one to be attached to the dashboard, may project laterally from the elongated body at a vertically intermediate point, while the floor engaging support element, may be carried at the lower end of the body. The elongated body may have an upper portion extending substantially directly vertically, and a lower somewhat inclined portion, both of which may be formed of tubing. The camera may be telescopically attached to the upper end of the upper of these portions, while the floor engaging element may be telescopically mounted to the lower end of the lower portion.

The above and other features and objects of the present invention will be better understood from the following detailed description of the typical embodiment illustrated in the accompanying drawing, in which:

Fig. 1 is a side view, partially in section, of a camera mounted in an automobile by means of a stand constructed in accordance with the present invention; and Figs. 2 and 3 are enlarged sections taken on lines 2—2 and 3—3 respectively of Fig. 1.

In Fig. 1, I have shown fragmentarily a conventional automobile, in which the usual metal dashboard is represented typically at 10, and the floorboard is represented at 11. The stand generally indicated at 13 mounts a camera 14 within the front seat area of the automobile, desirably to the right of the driver's seat, and at a location such that the camera may take pictures forwardly through the windshield 15. When desired, the camera may be turned horizontally to a position in which it may take pictures through one of the side windows of the car.

The stand 13 is vertically elongated, and includes an upper section 16, a lower section 17 and a vertically intermediate section 18. All three of these sections, are rigid, and are preferably formed of a suitable light metal, such as aluminum. The upper and lower sections 16 and 17 of the body may comprise merely a pair of cylindrical tubes, which may be stationarily attached to intermediate section 18 by reception of the ends of tubes 16 and 17 about cylindrical integral boss portions 19 of section 18. The tube may be pressed fit on the bosses, or may otherwise be secured in fixed relation thereto. The upper tube 16 preferably extends directly vertically, while the lower section 17 desirably extends angularly downwardly and forwardly toward the inclined forward portion 11a of the floorboard. The angularity of lower body section 17 may be such as to cause that body section to extend substantially perpendicular to portion 11a of the floorboard.

The central body section 18 is rigidly but removably attached to the underside of the lower horizontal portion 20 of dashboard 10 by means of a horizontally extending rigid connector member 21. Member 21 is rigidly attached to a lug 22 of body section 18, as by means of a pair of bolts 23. A second pair of bolts 24 may be provided for attaching the opposite end of connector 21 to the underside of the dashboard, these bolts passing through two parallel slots 25 in element 21, and then through two registering openings 26 drilled into the underside of the dashboard. As will be understood, connector 21 may be easily detached from the dashboard, merely by removing nuts 27 from the upper ends of attaching bolts 24.

In coacting with the connector or support element 21 in mounting stand 13 within the automobile, the lower section 17 of the stand body adjustably carries a second supporting unit 28, for engaging floorboard 11. This unit 28 includes a tube 29 telescopically received and adjustable within the lower end of tube 17, and rigidly carrying a nose piece 30, to which is attached a downwardly projecting threaded screw or bolt 31. Bolt 31 may be attached in fixed relation to nose piece 30 by a nut 32. As seen in Fig. 1, bolt 31 is receivable within, and of a diameter corresponding substantially to, a small preferably circular opening 33 formed in the inclined portion of the floorboard, to effectively locate the lower end of the body relative to the floorboard. The longitudinal adjustment of floor engaging unit 28, as permitted by telescopic reception of tube 29 within tube 17, allows for relative adjustment of the two support elements 21 and 31, to permit attachment of the device to automobiles in which the dashboard to floorboard spacing may vary. The telescopic connection 17, 29 may be set in any desired position by means of a knurled locking nut 34, which is threadedly connected onto tube 17, and acts to tighten an inner split ring against tube 29. This inner ring is not shown in connection with the joint between tubes 17 and 29, but is identical with a ring 35 shown in conjunction with a lock nut or ring 36 carried at the upper end of body 16. It is contemplated that in some instances, a device embodying certain features of the present invention will be designed for connection to portions of the automobile other than the dashboard and floorboard, as for instance the fire wall, steering column, or windshield frame.

The upper tubular section 16 of the stationary body of the device adjustably carries a camera mounting element 37, which may comprise a circular knurled cap threadedly connected at 38 onto the upper end of a vertically extending tube 39. Tube 39 is slidably received within the upper end of body section 16, to form therewith a telescopic connection allowing for vertical adjustment of camera mounting element 37 relative to the body. The previously mentioned nut 36 is threadedly connected at 40 onto the upper end of tube 16, and has a tapering wedge surface 41 engaging a correspondingly tapering outer surface 42 on the radially constrictable split wing 35, so that downward tightening of nut 36 relative to tube 16 acts to wedge ring 35 inwardly against tube 39. Ring 35 and nut 36 are thus adapted to releasably retain tube 39 in any desired vertical position relative to tube 16.

The camera mounting element 37 may have a central opening 43, through which a screw 44 projects upwardly for fastening the camera to element 37. Screw 44 may in certain instances be attached directly to the usual threaded socket provided at the underside of the camera, or as is more customary, the camera may be connected to screw 44 by means of a conventional universal joint type of connection 45. This connection 45 includes a lower member 46 into which screw 44 is connected at 47, and which has a horizontal undersurface engaging the upper surface of element 37 at 48. An upper joint section 49 is attached directly to camera 14, as by screw 50. As will be understood, the conventional universal joint 45 allows for both horizontal and vertical swinging movements of element 49 and camera 14 relative to the bottom joint member 46 and the stand. The universal joint unit may of course include suitable means for retaining the camera in any desired position relative to the stand, these means typically being represented by screw 51.

In order to install a stand of the illustrated type in an automobile, the first step is to drill the two holes 26 in the underside of the dashboard, and to drill the single hole 33 in the floorboard. Connector 21 may then be rigidly attached to the underside of the dashboard by means of screws 24 and nuts 27. Nut 34 on body section 17 is loosened to permit adjustment of tube 29 to a position in which screw 31 extends through opening 33, following which nut 34 is tightened to positively retain the floor engaging portions of the device in fixed relation to body section 17. The slots 25 in element 21 allow for a further adjustment of the positioning of the device within the automobile.

After the device has been installed in this manner, the height of the camera may be adjusted as permitted by the telescopic connection 16, 39, and the camera may then be used to take pictures through the windshield or a side window of the automobile, the universal joint 45 allowing for aiming of the camera in any desired direction. The lever or handle 52 is provided in connection with universal joint 45, for manually directing the camera.

Where the claims refer to a "camera mount" or use similar terminology, the phrase is intended to designate broadly any element or assembly which is designed to carry a camera, and in the illustrated form of the invention, may be considered as designating either the element 37, element 37 plus screw 47, or these parts plus the universal joint connection 45.

I claim:

1. A camera stand for use in an automobile having a dashboard and having a floorboard with an inclined forward portion; said stand comprising a body adapted to be detachably mounted in the automobile, said body including a leg projecting downwardly and forwardly and adapted to bear downwardly against said inclined forward portion of the floorboard, said body including an arm projecting forwardly from the body, a connection for attaching said arm to the underside of said dashboard, said body including an upper portion projecting substantially directly vertically upwardly beyond said leg and said arm at an angle to both and forming essentially an upper angularly turned continuation of said leg, a camera mount carried by said upper portion of the body for attaching a camera thereto at a location to photograph through a window of the automobile, and a second connection attaching said camera mount to said upper portion of the body for bodily vertical adjusting movement relative to the body and said leg and arm thereof.

2. A camera stand as recited in claim 1 in which said leg includes two sections which are relatively longitudinally adjustable to vary the length of the leg.

3. A camera stand as recited in claim 1 in which said leg has a lower end of reduced transverse dimension for engagement with said floorboard.

4. A camera stand as recited in claim 1 in which said leg comprises two tubular sections which are telescopically adjustable to vary the length of the leg, said leg having a lower end which tapers to a reduced transverse dimension for engagement with the floorboard.

5. A camera stand as recited in claim 1 including means for attaching a camera to said mount for relative tilting movement.

6. A camera stand as recited in claim 1 in which said body includes a rigid member joining together said leg and said arm and said upper portion of the body, said member having an upwardly projecting boss about which a lower tubular end of said upper portion of the body is received, and said member having an angularly downwardly and forwardly projecting boss about which an upper tubular end of the leg is received.

7. A camera stand as recited in claim 1 in which said arm projects substantially directly horizontally forwardly at its point of attachment to the rest of said body.

8. A camera stand as recited in claim 1 in which said leg comprises two tubular telescopically adjustable upper and lower sections, and means forming a reduced dimension end on the lower of said sections for engaging the floorboard, said second connection including a tubular upper element attached to said camera mount and telescopically adjustable relative to said upper portion of the body, said mount including an upwardly projecting screw carried by said upper element and adapted to be detachably connected to a camera.

9. A camera stand as recited in claim 8 including means for attaching a camera to said mount for relative tilting movement.

10. A camera stand as recited in claim 9 in which said body includes a rigid member joining together said leg and said arm and said upper portion of the body, said member having an upwardly projecting boss about which a lower tubular end of said upper portion of the body is received, and said member having an angularly downwardly and forwardly projecting boss about which an upper tubular end of the leg is received.

11. A camera stand for use in an automobile having a dashboard and having a floorboard with an inclined forward portion; said stand comprising a body adapted to be detachably mounted in the automobile, said body including a leg projecting downwardly and forwardly and adapted to bear downwardly against said inclined forward portion of the floorboard, said body including an arm projecting forwardly from the body, a connection for attaching said arm to the underside of said dashboard, said body including an upper portion projecting substantially directly vertically upwardly beyond said leg and said arm at an angle to both and forming essentially an upper angularly turned continuation of said leg, and a camera mount carried by said upper portion of the body for attaching a camera thereto at a location to photograph through a window of the automobile.

References Cited in the file of this patent

UNITED STATES PATENTS

| | | |
|---|---|---|
| 394,224 | Stone | Dec. 11, 1888 |
| 816,268 | Steindorf | Mar. 27, 1906 |
| 1,619,697 | Brown | Mar. 1, 1927 |
| 2,042,983 | Fairchild | June 2, 1936 |
| 2,184,358 | Moore | Dec. 26, 1939 |
| 2,219,169 | Alter | Oct. 22, 1940 |
| 2,458,117 | Tolbert | Jan. 4, 1949 |
| 2,647,001 | Andersson | July 28, 1953 |
| 2,657,107 | Bisaga | Oct. 27, 1953 |

FOREIGN PATENTS

| | | |
|---|---|---|
| 349,291 | Germany | Feb. 27, 1922 |
| 479,747 | Germany | July 24, 1929 |